Feb. 15, 1944.　　　　　E. T. CARLSON　　　　　2,341,841
ELECTRIC POWER DISTRIBUTION SYSTEM
Filed July 19, 1941　　　3 Sheets-Sheet 1
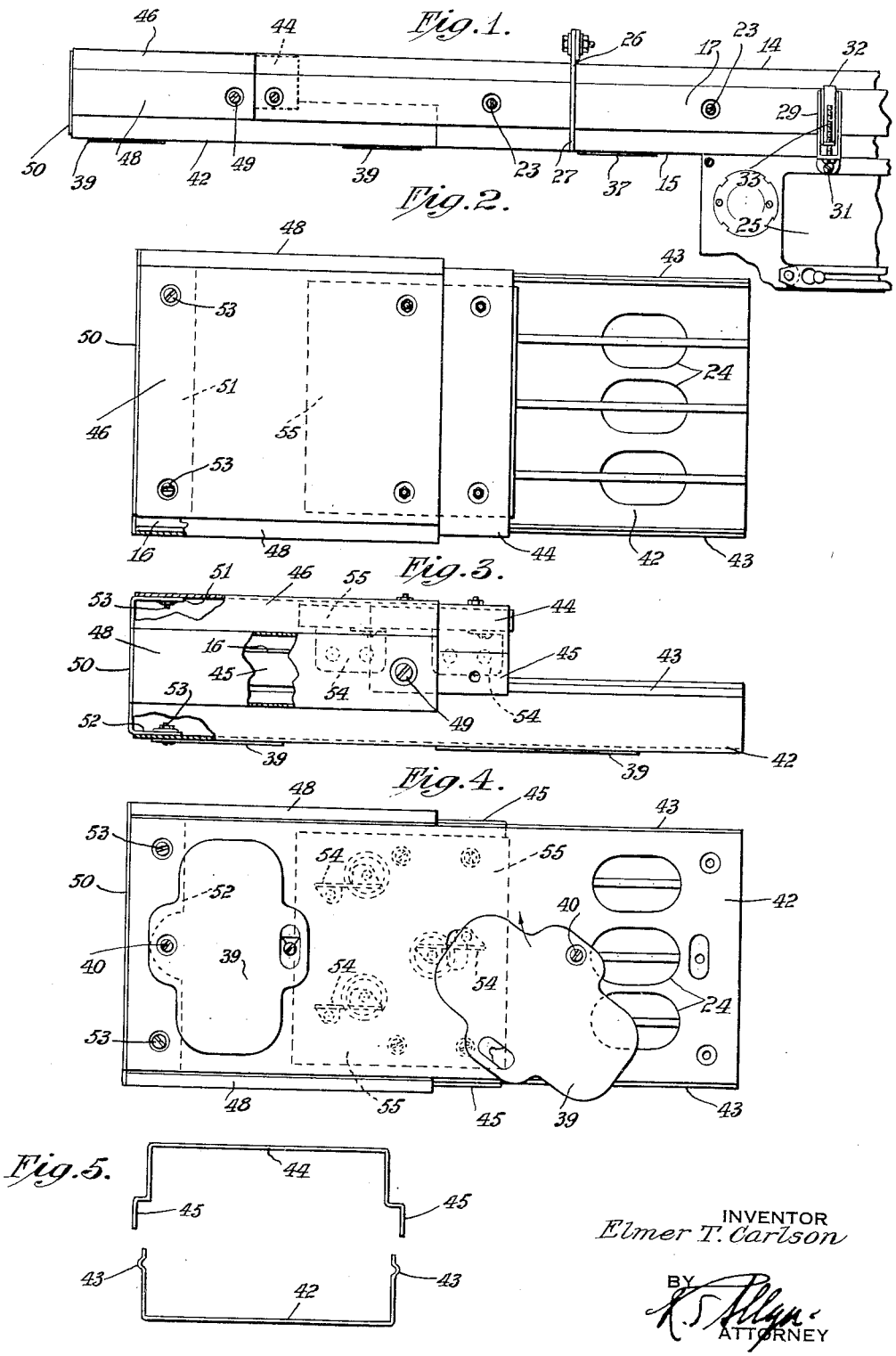
INVENTOR
Elmer T. Carlson
BY
ATTORNEY

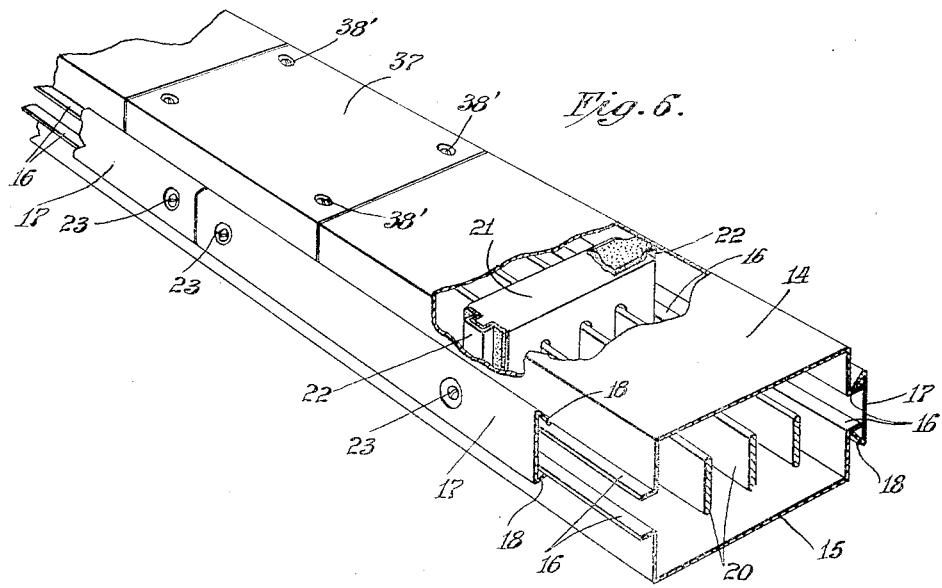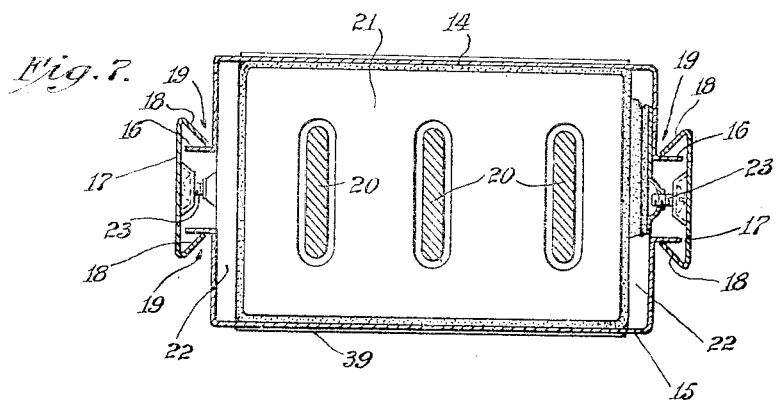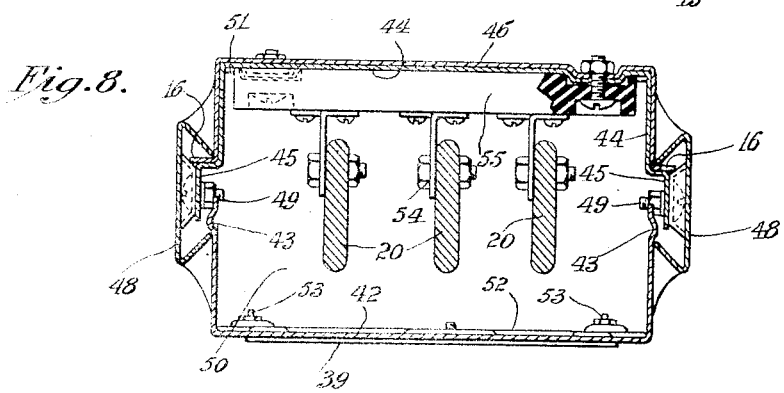

Feb. 15, 1944.   E. T. CARLSON   2,341,841
ELECTRIC POWER DISTRIBUTION SYSTEM
Filed July 19, 1941   3 Sheets-Sheet 3
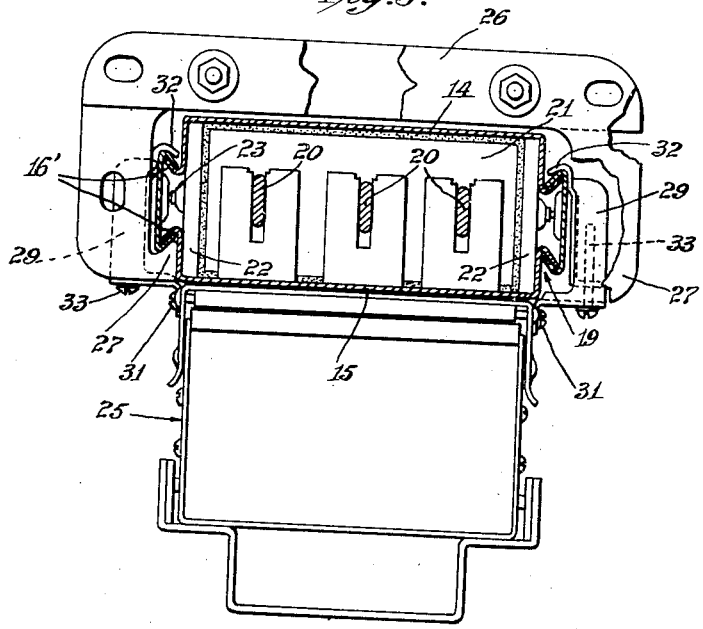
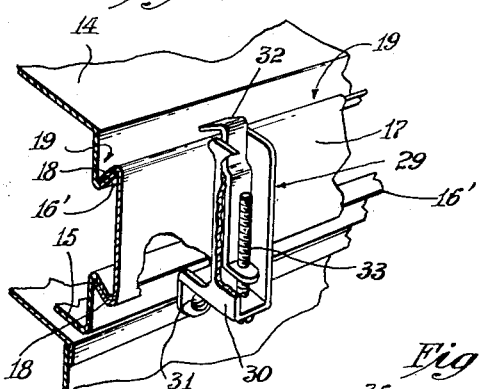
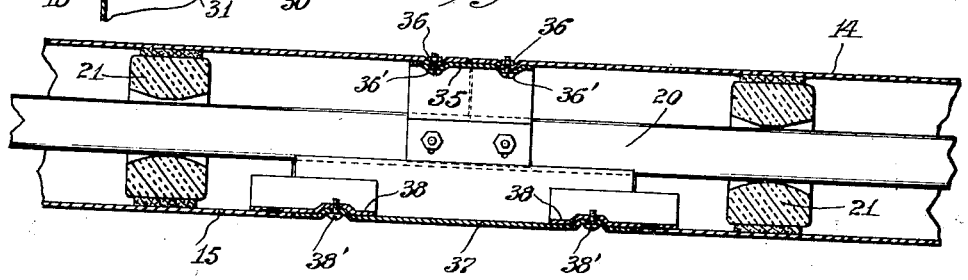
INVENTOR
Elmer T. Carlson
BY
ATTORNEY Patented Feb. 15, 1944

2,341,841

UNITED STATES PATENT OFFICE

2,341,841

ELECTRIC POWER DISTRIBUTION SYSTEM

Elmer T. Carlson, Fort Mitchell, Ky., assignor to The Trumbull Electric Manufacturing Company, Plainville, Conn., a corporation of Connecticut Application July 19, 1941, Serial No. 403,216

2 Claims. (Cl. 174—99)

My invention relates particularly to enclosed bus bar duct systems.

One object is to provide a rugged duct structure that can be readily made and installed and that is adapted to many forms of installation.

Another object is to provide a structure which is adapted to accommodate supports and hangers at any point without drilling or punching holes in the enclosure.

The broad idea involved in my invention includes the formation of the duct in four parts, i. e., upper and lower channel members with outwardly flaring flanges and side binder or molding strips embracing the flanges and closing the spaces between the flanges. The bus bars are positioned by insulating blocks which in turn are held by spreaders to which the strips are secured. The strips are so formed as to facilitate the attachment of supporting yokes and also the attachment of hangers to support branch box connectors and the like. The invention may be adapted to various forms of bus bar systems and various forms of branch connectors and other plug-in devices. I have shown it for a three wire system but obviously the number of conductors is immaterial.

Fig. 1 is a side view on a small scale of one end of a duct system embodying my invention.

Fig. 2 is a plan view of the end box of Fig. 1 on a larger scale.

Fig. 3 is a side view of the end box of Figs. 1 and 2.

Fig. 4 is a bottom view of the parts of Figs. 2 and 3.

Fig. 5 is a schematic end view of the upper and lower parts of the end box and also of the splice plate for a long section cover and a joint inspection plate or cover.

Fig. 6 is a perspective view of a part of the duct system, parts being broken away to show the interior supports.

Fig. 7 is a cross sectional view on a larger scale.

Fig. 8 is a cross sectional view of the end box of Figs. 2 and 4.

Fig. 9 is a cross sectional view of a modification showing a hanger and a plug-in box attached to the duct.

Fig. 10 is a perspective view showing one of the hanger clamps.

Fig. 11 is a longitudinal sectional view of a part of the duct system showing a joint.

The channels 14 and 15 form the upper and lower parts or covers, respectively, of the duct system and have lateral flanges 16, 16 on each side connected by channel-like moldings 17 whose edges 18, 18 are bent inwardly so as to form grooves 19 above and below.

The bus bars 20 are positioned by insulating blocks 21 which are in turn positioned by channel-like spreaders or posts 22, 22, each of which is anchored to the duct by screws 23, 23. The posts and blocks may be moved along the duct to any point necessary to coact with the screws.

The covers are provided with openings 24, 24 at intervals to accommodate the terminal blades or stabs (not shown) of connector boxes 25 where desired. The openings 24 when not in use are closed by cover plates 39 which are pivoted so as to be swung to open and close the openings and may be screwed by screws 40.

A support or yoke 26 has hooks 27 adapted to engage in grooves 19 below the moldings. The branch box connector may be supported by hangers 29. Each hanger is composed of a body part 30 attached by a screw 31 to the box and a hook 32 connected to the body by an adjusting screw 33 so that the box can be drawn up snugly against the duct.

The upper and lower parts of the duct are preferably made up of long and short sections, the long sections being united by splice pieces 35 and nuts 36 and bolts 36', and the spaces between the short sections for access to the bus bar connections being closed by removable inspection plates 37 secured to extension or splice pieces 38 in the ends of the short sections by means of screws 38'.

The bus bars are joined by suitable nuts and bolts at the end of each section, and these joints are exposed upon removal of the inspection covers 37.

The end box of a run may be formed somewhat differently although using parts like splice piece 35 and inspection plate 37 (see Figs. 1 to 5 and 8). The lower channel part 42, like member 37, has a rib 43, and the upper part 44, like part 35, has a flange 45. The upper part is embraced by a channel 46 having the flanges 16. The molding 48 embraces these parts and is held in place by a screw 49. The end is closed by a plate 50 which has flanges 51 and 52 secured to the upper and lower parts by screws 53. The terminal lugs 54 are mounted on an insulating base 55 secured to the channel 46. The flanges 16' on the main sections of the duct may be inclined at an angle (see Figs. 9 and 10) but it is more difficult to assemble such a structure.

Ordinarily these ducts are formed of sheet metal such as steel. By forming one of the channels or one of the moldings of non-magnetic material such as aluminum or brass I can prevent the formation of a complete magnetic field around the bus bars and still make the major part out of the less expensive and strong sheet iron or steel. This in some cases is quite important because a complete magnetic field will often cause humming or cause undue heating of the enclosure.

I claim:

1. In a bus bar duct system, a housing consisting of upper and lower channel-like sections having flanges extending laterally along the edges thereof, cover strips uniting the flanges along opposite sides, each cover strip having inturned flanges embracing the adjacent flanges of the housing sections, a series of independent supporting posts mounted within the housing along each side thereof for supporting bus bar insulators at intervals in the housing and fastening members passing through the cover strips between the flanges of the housing sections and engaging the respective supporting posts.

2. In a bus bar duct system, a housing consisting of upper and lower channel-like sections having flanges extending laterally along the edges thereof, cover strips uniting the flanges along opposite sides, each cover strip having inturned flanges embracing the adjacent flanges of the housing sections, a series of independent supporting posts mounted within the housing along each side thereof for supporting bus bar insulators at intervals in the housing, said posts extending from the upper wall of the lower section to the lower wall of the upper section and holding the sections at predetermined distances apart and fastening members passing through the cover strips between the flanges of the housing sections and engaging the respective supporting posts.

ELMER T. CARLSON.